Figure 1:
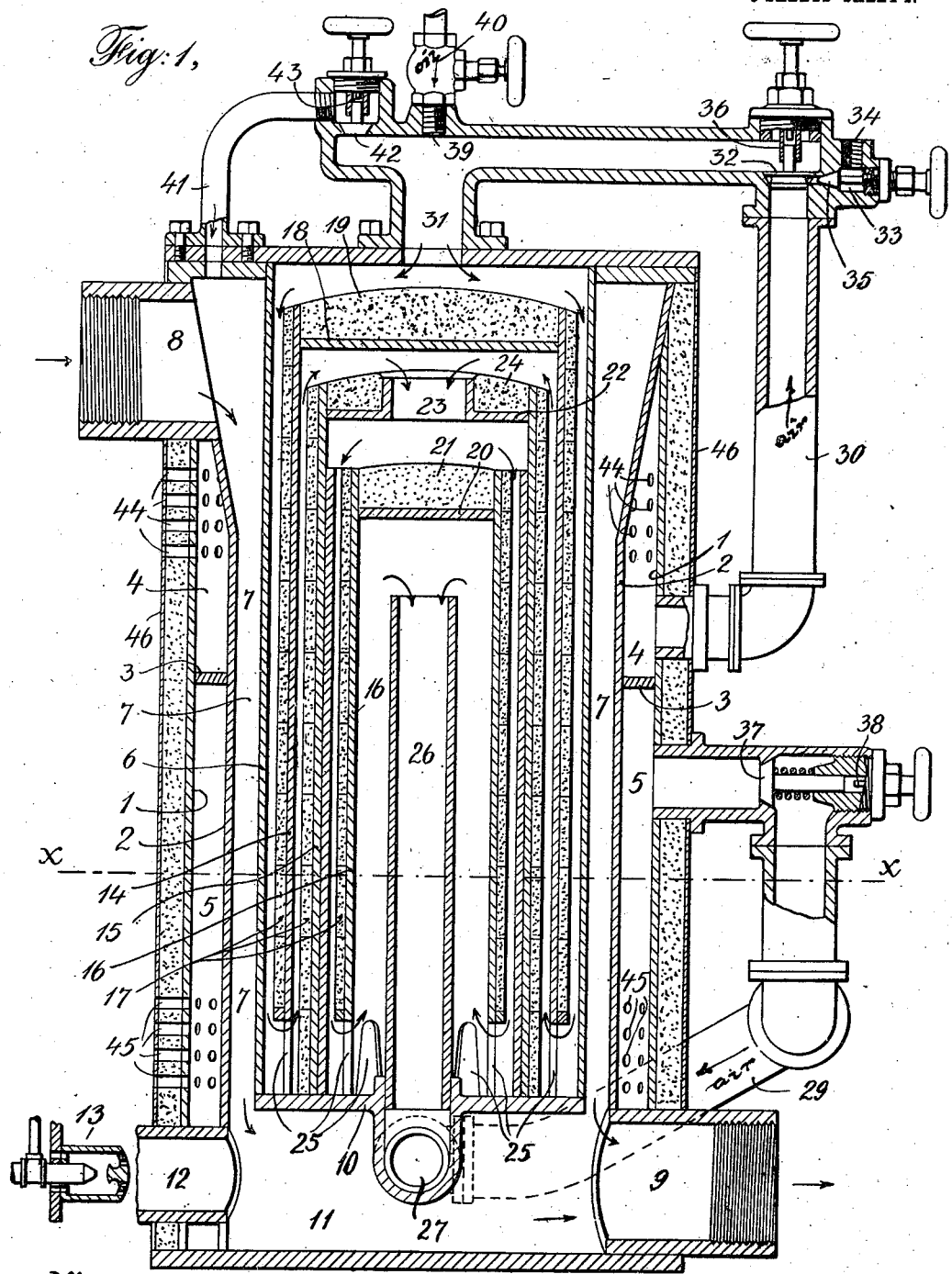

E. B. BENHAM.
PROCESS OF AND APPARATUS FOR MAKING GAS.
APPLICATION FILED OCT. 16, 1909.

1,000,768.

Patented Aug. 15, 1911.

6 SHEETS—SHEET 1.

E. B. BENHAM.
PROCESS OF AND APPARATUS FOR MAKING GAS.
APPLICATION FILED OCT. 16, 1909.

1,000,768.

Patented Aug. 15, 1911.

6 SHEETS—SHEET 2.

E. B. BENHAM.
PROCESS OF AND APPARATUS FOR MAKING GAS.
APPLICATION FILED OCT. 16, 1909.

1,000,768.

Patented Aug. 15, 1911.

6 SHEETS—SHEET 3.

Witnesses:
Max B. A. Doring
Paul H. Frank

Inventor
Elijah B. Benham
By his Attorneys

E. B. BENHAM.
PROCESS OF AND APPARATUS FOR MAKING GAS.
APPLICATION FILED OCT. 16, 1909.

1,000,768.

Patented Aug. 15, 1911.

6 SHEETS—SHEET 4.

Witnesses:
Max B. A. Doring
Paul H. Frank

Inventor
Elijah B. Benham
By his Attorneys

E. B. BENHAM.
PROCESS OF AND APPARATUS FOR MAKING GAS.
APPLICATION FILED OCT. 16, 1909.

1,000,768.

Patented Aug. 15, 1911.

6 SHEETS—SHEET 5.

Witnesses:
Max B. A. Doring
Paul H. Frank

Inventor
Elijah B. Benham
By his Attorneys
Marble & Ouatty

E. B. BENHAM.
PROCESS OF AND APPARATUS FOR MAKING GAS.
APPLICATION FILED OCT. 16, 1909.
1,000,768.
Patented Aug. 15, 1911.
6 SHEETS—SHEET 6.
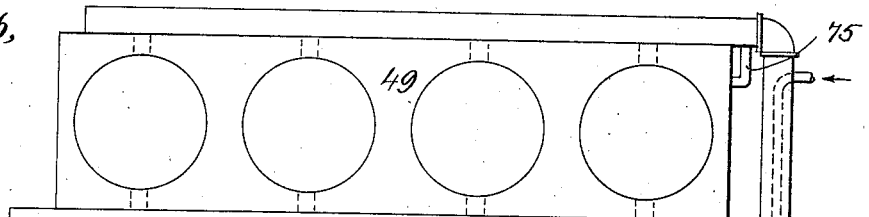
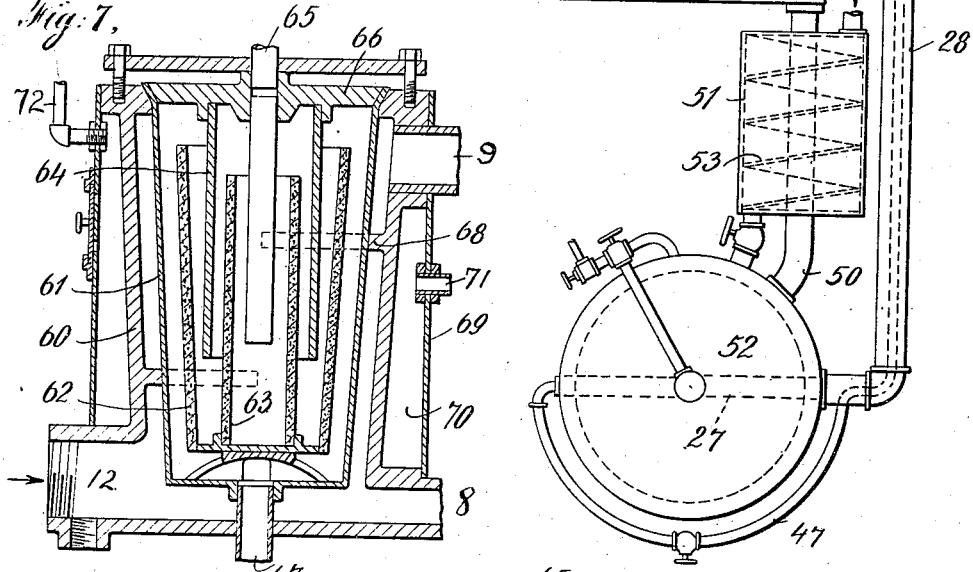
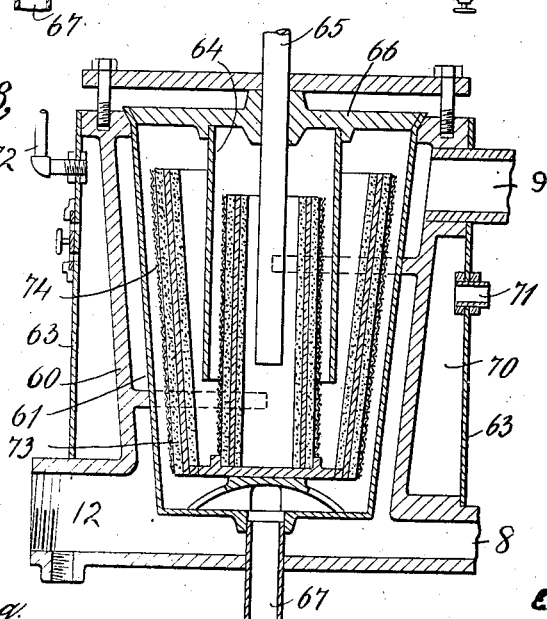

UNITED STATES PATENT OFFICE.

ELIJAH B. BENHAM, OF NEW LONDON, CONNECTICUT, ASSIGNOR TO HYDROCARBON CONVERTER COMPANY, OF NEW YORK, N. Y., A CORPORATION OF DELAWARE.

PROCESS OF AND APPARATUS FOR MAKING GAS.

1,000,768.

Specification of Letters Patent.   Patented Aug. 15, 1911.

Application filed October 16, 1909.   Serial No. 523,043.

*To all whom it may concern:*

Be it known that I, ELIJAH B. BENHAM, a citizen of the United States of America, and a resident of New London, county of New London, and State of Connecticut, have invented a certain new and useful Process of and Apparatus for Making Gas, of which the following is a specification.

This invention relates to a method of and apparatus for gasifying hydrocarbon oils, particularly crude oils, "scalped oils," (*i. e.*, crude oils which have been deprived of the greater portion of their lighter hydrocarbons,) distillate, fuel oil, and the like.

As a process the invention comprises passing oil, preferably mixed with air or other gas, through a high temperature zone containing a material which preferably is a non-metallic clayey or silicious material, said zone being maintained at a temperature which preferably is at or above 800° Fahrenheit and preferably approximates 1100° to 1500° Fahrenheit; and the invention further comprises causing the oil, or mixture of oil and gas, to impinge upon a body of such material directly upon its entrance into such high temperature zone, and then causing the resulting gas or vapor to pass through a farther portion of such high-temperature space, thereby, if the temperature in such space be sufficiently high, "fixing" all or the greater portion of the hydrocarbon compounds present. In such process the air, if present, not only serves as a carrier for the oil, but the oxygen of the air combines with the hydrocarbon compounds, producing marked changes in composition.

In gasifying crude or heavy oils, such as referred to, particularly when the gas produced is to be used in a gas engine, it is extremely desirable to avoid deposition of tar or carbon or the like in the gasifying apparatus, or in the engine cylinder, since, as is well known, these carbonaceous deposits if formed clog the gasifying apparatus and are apt to be carried forward into the engine and foul the engine cylinder. It has been found that in the apparatus herein described the deposition of tar, carbon and the like, is not experienced, notwithstanding that the composition of the hydrocarbon compounds originally present in the oil is greatly changed.

Feeding air in in considerable quantities, with the oil, appears to affect materially the character of the gasifying action taking place, and also to very greatly increase the gasifying capacity of the apparatus. There appears to be more or less combination of oxygen of the air so fed in with the hydrogen of the hydrocarbon compounds of the oil, and also with the carbon, and there appear also to be marked chemical changes in the hydrocarbon compounds of the oil, the carbon and hydrogen of the heavy hydrocarbons apparently recombining in the form of lighter hydrocarbons which are either fixed gases or quite volatile compounds.

As an apparatus the invention comprises a gasifier or hydrocarbon converter, comprising a space adapted to be maintained at a high temperature and through which the oil or mixture of oil and gas must pass in a path of considerable length, such space containing, preferably in its initial portion, bodies of material, preferably of a clayey or silicious nature, with which the oil will contact and which influence the chemical changes taking place in the apparatus hereinafter described, in connection with means for passing oil, and preferably, a mixture of oil and air or other gas, through such space.

The invention also comprises various other features more particularly described hereinafter and pointed out in the appended claims.

In the accompanying drawings certain forms of oil gasifying apparatus embodying the invention are illustrated.

Figure 2:
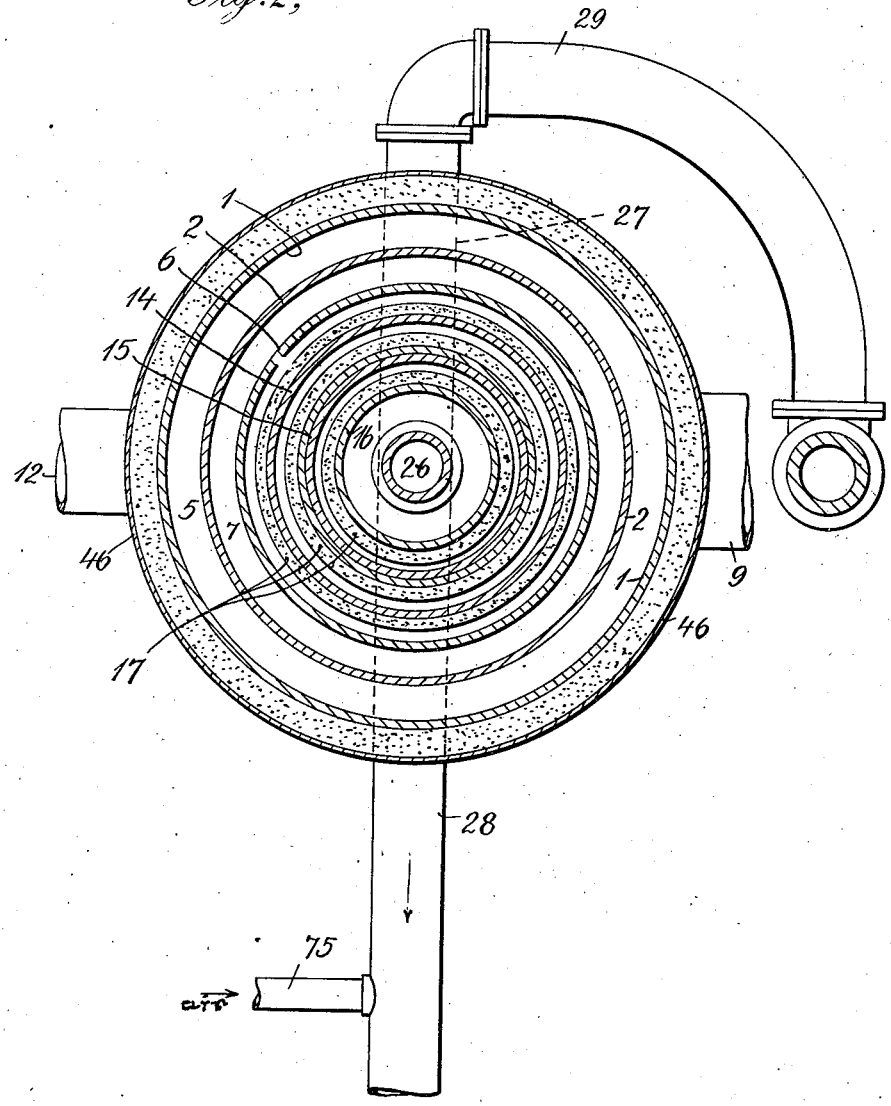
Figure 3:
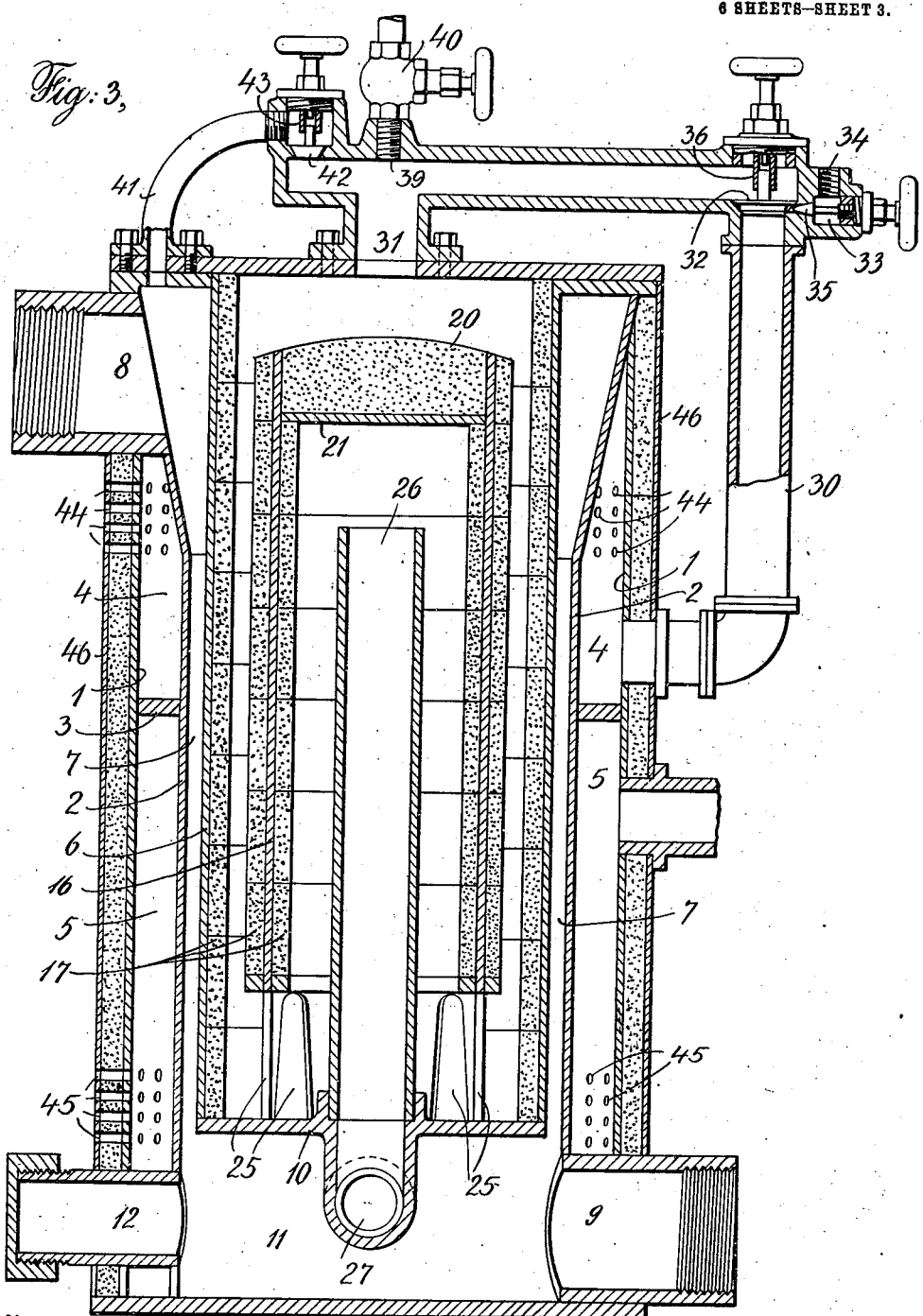
Figure 4:
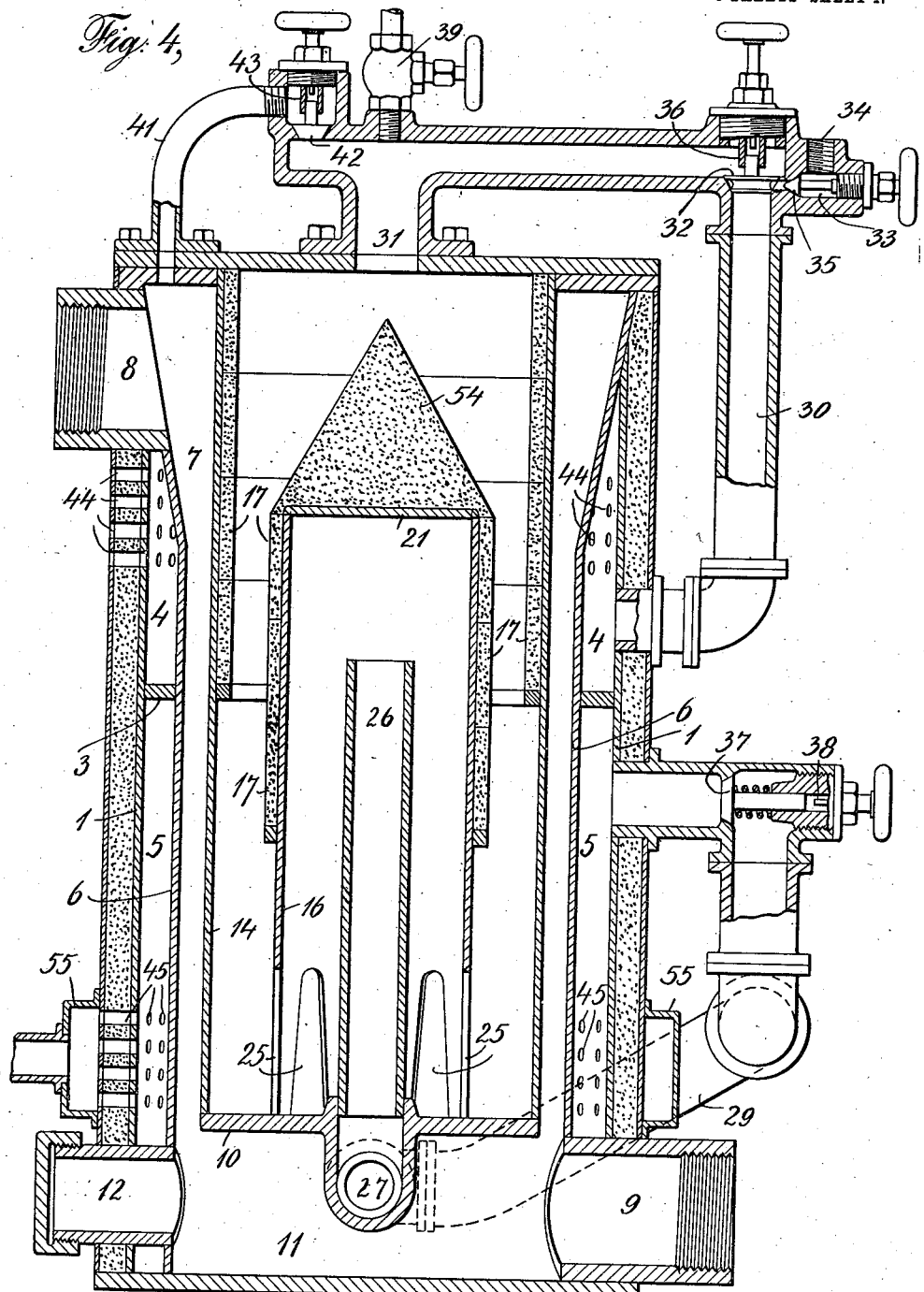
Figure 5:
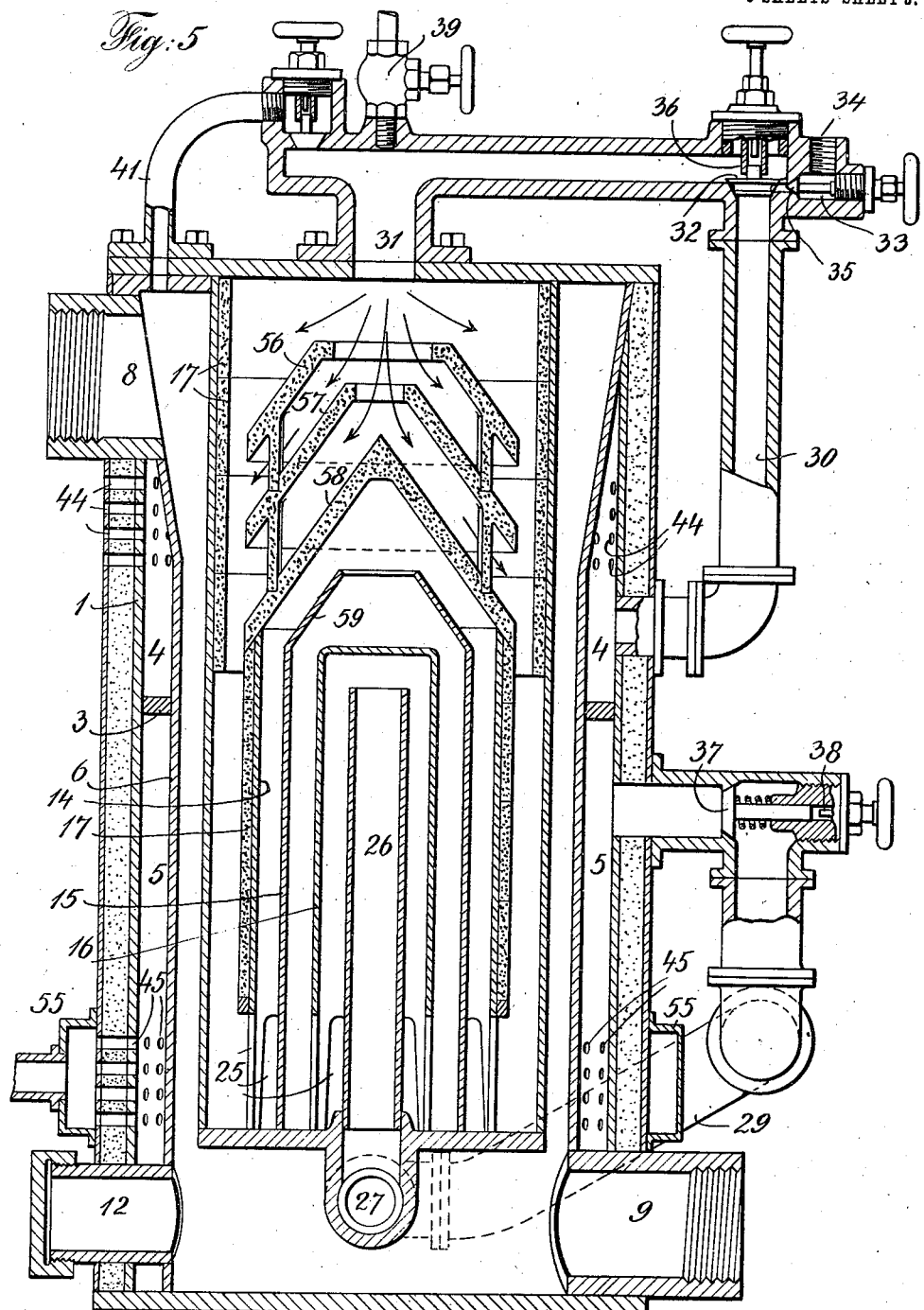

In said drawings: Figure 1 shows a central vertical section of one preferred form of the improved oil gasifying apparatus; Fig. 2 shows a transverse section of the apparatus of Fig. 1 on the line *x—x* of Fig. 1; Fig. 3 shows a vertical section of a similar but slightly different alternative form of the apparatus; Fig. 4 shows a vertical section of a further alternative form of the apparatus; and Fig. 5 shows a vertical section of still another form of the apparatus; Fig. 6 shows, more or less diagrammatically, a plan view of an internal combustion engine with a converter or gas making apparatus such as herein described connected thereto, and also shows various expedients for heating air, which may be employed in the apparatus; Fig. 7 shows a vertical section of a further form of the apparatus and Fig. 8 a vertical section of another similar apparatus.

In the following description, the gas making apparatus is referred to, in general, as a converter, the function of the apparatus being to convert complex and heavy hydrocarbons, such as are contained in hydrocarbon oils such as mentioned, into a gas suitable for use in internal combustion engines.

Referring first to Figs. 1 and 2, the apparatus there shown comprises a vertical cylinder 1 having within it another cylinder 2, these two cylinders inclosing between them an air space preferably divided by a horizontal partition 3, into an upper chamber 4 and a lower chamber 5. Within cylinder 2 is another cylinder 6, inclosing between itself and said cylinder 2, a jacket space 7 through which, in practice, the exhaust gases of a gas engine, or other suitable heating gases, are circulated; such gases customarily entering at 8 and passing out at 9. Cylinder 6 does not extend clear to the bottom of the apparatus, there being between the bottom 10 of this cylinder 6 and the bottom of the apparatus, a considerable chamber 11 through which the heated gases circulate, so heating the lower portion of cylinder 6 and its contents; said chamber also forming a space of adequate dimensions to collect the heating gases passing through the narrower portions of the jacket space 7, and to conduct such gases to the discharge pipe 9. This chamber 11 may have a port 12 into which the flame of a suitable heating burner 13 may be projected, for initially heating the apparatus in starting up; and at times when this burner is not in use this port 12 may be closed in any suitable manner.

The interior of cylinder 6 is divided into a plurality of narrow passages, lined on one wall at least with porous material, by means of concentric cylinders 14, 15 and 16, each provided with a covering 17 of material such for example as earthenware, crucible material, asbestos, etc. In Fig. 1 these linings are shown as composed of a series of concentric rings resting one upon another. Cylinder 14 is closed at the top by a head 18 preferably provided with a covering of material 19 preferably of a nature similar to that of the coverings 17, and so located that the oil or mixture of oil and gas, impinges on this head directly upon the entry thereof into the cylinder 6. Cylinder 16 is closed at the top by a similar head 20, which may be provided with a similar covering 21, and the intermediate cylinder, 15, is provided with another similar head 22, except that this head has in it a central port 23; and this head 22 may have a covering of material 24 similar to the coverings 19 and 21. In the lower portion of the cylinders 14 and 17 are ports or openings 25. It will be seen that the annular channels between cylinders 6 and 14, 14 and 15, and 15 and 16, together constitute a zig-zag or return-bend passage leading to the interior of cylinder 16. An outlet pipe 26 extends upwardly through the bottom 10 of cylinder 6 to near the top of cylinder 16, where it is open; and at its lower end this discharge pipe 26 communicates with a cross passage 27, one end of which is connected to the gas delivery pipe 28, while the other end is connected by a pipe 29 with the lower air-chamber 5. The upper air chamber, 4, is connected by a passage 30 with a port 31 opening into cylinder 6, just above the head of cylinder 14. In this passage 30 there is a valve 32 adapted to seat in a suitable seat formed in said passage, said valve 32 being grooved; and said pipe 30 is provided with an oil admission duct 33 connecting with an oil supply connection 34; a needle valve 35 regulating the passage of oil; the whole forming a mixing valve for mixing oil with the entering air. Valve 32 may be held seated by means of a valve stem 36, arranged to screw downward in the ordinary manner, and which, when screwed down, holds the valve 32 against its seat. In the air pipe 29 there is a spring loaded valve 37 arranged to open outwardly so as to permit flow of hot air from air chamber 5, but to prevent back flow of gas, and this valve may be held down to its seat by a stem 38. Just above port 31 there is provided, in pipe 30, an auxiliary connection 39, controlled by a valve 40. A relief passage 41 is provided connecting pipe 30 with the chamber 7, through which chamber the exhaust gases pass, and this relief passage is controlled by a check valve 42 which may be held to its seat by means of a stem 43. Air is admitted to the air heating chambers 4 and 5 through ports 44 and 45 respectively. The main cylinder 1 of the apparatus is surrounded by a jacket 46 which may contain suitable lagging.

The operation of this apparatus is as follows: Supposing the apparatus to be already heated, and supposing that hot exhaust gases of a gas engine, are passing through the heating chamber 7, and that the gas delivery pipe 28 is connected to a gas engine or to some other means for producing suction and so drawing air and oil through the apparatus and for drawing off the gas produced, this suction lifts the valve 32 somewhat, so drawing heated air from the chamber 4, and, the oil admission valve 35 being open, oil passes through the duct 33 to the groove in the valve plug 32 and there mixes with the entering air, being carried forward through pipe 30 and port 31, and projected against the covering 19 of cylinder 14, whence the oil or its vapor or gas formed therefrom, passes together with air, downward in the space between cylinders 6 and 14, where combustion begins owing to the high temperature already existing in such space, the gases thence passing through ports 25 and up through the space between cylinders 14 and 15, through port 23 and down through the space between cylinders 15 and 16, and thence up through the interior of cylinder 16 and out through pipe 26. At the end of which passage the hydrocarbon compounds have been converted entirely into a fixed gas, or nearly so, according to circumstances. In this operation the oil is converted into gas without deposition of tar or carbon. Experience shows that the failure to deposit carbon or tar is due to the covering material 19 on the head of cylinder 14 and the material 17 surrounding said cylinder, which therefore obviously exert a material influence upon the gasification of the oil so entering, since as has been found in actual experience, if these silicious coverings, which as so far used have been both porous and of low heat conducting capacity, be omitted, so that plain, non-porous iron surfaces are exposed to contact with the oil and its vapor, then while the oil is converted into gas, yet there is much deposit of tar or carbon or the like.

The velocity of entrance of the combustible mixture is of course sufficiently high to prevent combustion in the immediate vicinity of the point of entrance, the portion of the interior of cylinder 6 above porous material 19 and immediately surrounding the point of entrance being a region of moderate temperature, which gradually increases toward the periphery of the porous body 19; it being of course evident that if combustion occurred immediately at the point of entrance of the combustible mixture, the influence of the porous material 19 on the entering mixture would be exerted to less extent at least.

The material preferred for the coverings 17, 19, 21 and 24, is a material similar to that used in making graphite crucibles (which material is herein termed "crucible material") and which is understood to be a mixture of clay, graphite and silicate, present in about the following proportions: graphite (containing fifty per cent. pure carbon) sixty per cent.; clay, thirty per cent., and silicate ten per cent. In making the rings for the lining, this material is formed into shape and is then fired at a high temperature. This crucible material is extremely strong, and has a low coefficient of expansion (and so is not liable to destruction from changes in temperature) and apparently is not affected even after long periods of use, by the heat of the converter, or by variations of temperature, or by jar or vibration, or by the air and oil or vapors or gases in the converter. Ordinary clay pottery is another good material for the coverings; and so is terra cotta. Asbestos has also been used with success, but it has been found that asbestos, after long use, becomes disintegrated and also becomes covered with a layer of what appears to be graphitic carbon, after the formation of which layer the gas making capacity of the apparatus is somewhat less. It has also been found that in a converter such as shown in Fig. 1, in which the covering material used is asbestos, the disintegration of the asbestos referred to, is confined practically to the head of the cylinder 14 and the upper portion of the covering of the walls thereof.

Analyses of gas taken from the converter at different times, have shown varying composition of resulting gas, the differences being probably due to use of different oils, to different proportions of air and oil admitted, etc. One fair average composition is as follows (the analysis being made in the main by the wet absorption method, with a Hempel apparatus);

| | |
|---|---|
| Carbon dioxid | 7.6 |
| Free oxygen | 1.2 |
| Illuminants | 9.4 |
| Carbon monoxid | 3.1 |
| Free hydrogen | 1.9 |
| Methane | 7.5 |
| Nitrogen | 69.3 |

Calorific value 285 B. T. U.

Another analysis taken at a different time showed the following:

| | |
|---|---|
| Carbon dioxid | 6.5 |
| Free oxygen | 4.7 |
| Illuminants | 7.8 |
| Carbon monoxid | 2.0 |
| Free hydrogen | 2.0 |
| Methane | 3.3 |
| Nitrogen | 73.7 |

Calorific value 204.87 B. T. U.

These analyses indicate a limiting, partial, and highly restricted combustion within the converter, accompanied by a great change in the hydrocarbon compounds present in the original oil, the complex compounds of the paraffin group which form the main constituents of such oils having disappeared, the combustible components of the gas being all fixed gases.

The exhaust of an engine operating on gas made in this converter, is smokeless and practically odorless. One important feature of this converter is that it forms a very efficient muffler for the engine in connection with which it is used, the exhaust from the engine, as it finally escapes from the converter, being therefore practically noiseless.

Notable fuel economies have been experienced with this converter, as compared with the use of gasolene in an ordinary carbureter in the same engine. In one case, an engine developing approximately seventy horse power (the engine being one designed for use with gasolene and provided with an efficient carbureter of standard make) showed a gasolene consumption, during an eight hour run, of ninety six gallons of gasolene. The same engine operated under precisely the same load and at the same speed for the same length of time, but operated on gas made by a converter such as illustrated in Fig. 1, from fuel oil, used only forty gallons of this fuel oil. The calorific value of the fuel oil and of gasolene not being greatly different, the lower fuel consumption, when using a heavy oil, is undoubtedly due to more efficient combustion in the engine cylinder when using gas than when gasolene is used; and such more efficient combustion is further evidenced by the practical absence of odor from the exhaust of the engine when operated on gas from the converter; whereas, as is well known, the exhaust from engines operated on gasolene vaporized in ordinary carbureters, usually has a notable smell of gasolene and other hydrocarbon compounds.

Attempts to condense the gas made by the converter has shown that when the converter is not operating above its intended capacity, there is practically nothing in the resulting gas which can be condensed. In other words, the heavy oil has been converted into a fixed gas. When the converter is operated much above its proper capacity, that is to say, when the oil is fed to it at a rate much greater than its capacity for converting it into a fixed gas, the gas of necessity contains more or less condensable hydrocarbon compounds; but even such gas if used immediately in the engine, will operate in the engine cylinder substantially as well as the fixed gas shown by the above analysis, and with substantially the same fuel economy; probably for the reason that the hydrocarbon compounds existing in the condensable portion of the mixture are in the main relatively volatile as compared with the oil fed to the converter, and also because such condensable constitutents are present in the gas, as received in the engine cylinder, in the form of gas (i. e., evaporated liquid) instead of being present as a mist, as the vapor of gasolene produced by an ordinary carbureter undoubtedly is. A true gas undoubtedly burns much more readily and, during the extremely limited combustion period provided in a gas engine cylinder, much more completely, than does the vaporous mist produced by an ordinary carbureter.

As previously explained, in starting up the converter in the first instance, it may be heated up by a flame projected through a port 12 into the exhaust gas space of the converter; the heat so imparted to the converter serving, upon the entrance of the combustible mixture into the space between cylinders 6 and 14, to initiate combustion in such space. After the converter has once been operated for a reasonable length of time, the engine can usually be started, even if it has been out of operation for a considerable time, by the gas contained in the converter and piping, aided doubtless by evaporation from oil and light hydrocarbons absorbed in the pores of the porous lining of the walls of the converter. Or, gasolene, alcohol, or other volatile fuel, may be admitted directly to the conveyer through the valve 40, the porous surfaces of the converter forming excellent absorption and evaporation surfaces. And, in the same way, the converter may be started initially by admitting gasolene or alcohol through the oil supply duct 33, the heavy oil being admitted as soon as the converter is well heated. Or, the engine may be started on gasolene or like fuel vaporized in an ordinary carbureter attached to the engine, the exhaust gases from the engine being passed through the converter and the heavy oil being admitted to the converter and the converter started in operation, as soon as well heated, the carbureter being then cut off. But this latter procedure is not in general necessary, or advisable, since it is desirable to do away with the use of the ordinary carbureter, such as at present used upon gasolene engines, and thus do away with the possibility of fire due to back firing of the engine through the carbureter.

It will be noted that in this converter herein described, back firing from the engine into the converter can do no damage, since the gas in the converter contains a proportion of air far from sufficient for explosion or complete combustion; and the valves 37 and 32 prevent forcing of flame gases or combustible gases back through pipes 29 and 30 into the hot air spaces 5 and 4; so that escape of combustible gases from the air ports 44 and 45 is substantially impossible.

By-pass passage 41 permits the relief of any pressure which may exist in the converter as a result of shutting down the engine suddenly while the converter is hot and possibly without cutting off the oil supply soon enough; for when valve 42 is open, any gas pressure existing in the converter will be relieved through pipe 41, the gas passing off into the exhaust space. Normally this valve 42 is kept closed.

By adjusting the permissible degree of opening of valve 32, and similarly by adjusting the permissible degree of opening of valve 37 and adjusting the strength of the spring tending to close the latter valve, any desired balance may be reached between the amount of air drawn in with the oil through pipe 30 and the amount of air drawn in through pipe 29 and mixed with the gas as the latter issues from the converter; and in this way the amount of air admitted with the oil may be regulated so as to admit such proportion of air (materially less than that sufficient for complete combustion) with the oil, as desired, and to admit through the pipe 29 a further proportion of air, which may be that required for complete combustion. Obviously, if all the air required for complete combustion were admitted through pipe 30 and valve 32, the action in the converter would probably be very greatly modified and probably much poorer gas would result.

Heretofore it has ordinarily been considered desirable, when heated gas is supplied by a gas producer or blast furnace or the like, to cool the gas before admitting it to the engine cylinder; and indeed, it is substantially impossible to supply to an engine cylinder an amount of gas sufficient for development of full power in the engine, when that gas is drawn from an ordinary gas producer or blast furnace, unless the gas be first cooled. It will be noted from the above analyses, however, that the gas produced by this converter is a rich gas; and it has been found desirable to supply this gas hot to the engine cylinder, and also to heat the air required for combustion of the gas in the engine cylinder, before mixing such air with the gas; hence the provision in this converter of the air heating space 5 which serves to heat the additional amount of air required for complete combustion. It is possible that the hot mixture of gas and air so supplied to the engine burns more readily than the cold mixture hitherto usually supplied, and that the high fuel economy obtained as instanced above, is due in part to the supply of a hot mixture. It is also probable that the ready combustion obtained and high fuel economy realized when the gas supplied is not all a fixed gas, is due in large measure to the supply of a hot mixture to the engine. If desired, a further quantity of hot air may be mixed with the gas by providing the gas discharge pipe 28 with an air heating passage 47 (Fig. 6) arranged in such proximity to the pipe 28 that air passing through this passage 47 will be heated by the issuing gas. In the construction shown in Fig. 6, this air heating passage passes through the gas discharge pipe and thence is connected to the cross pipe 27. By means of pipe 29, and if necessary, the pipe 47, all the air necessary to be supplied to the engine may be supplied hot and at the converter.

While in the converter shown in Fig. 1, one wall of each portion of the gas passage leading from the inlet port 31 to the escape pipe 26 is of metal, unlined, and although the pipe 26 is of metal unlined, no formation of carbon or tar deposits seems to result from these exposed metal surfaces, so long as the porous coverings 17 and 19 shown are present, although, as stated, if they are removed, formation of tar or carbonaceous deposits is experienced to a great extent. The influence of the porous material, whatever it may be, appears to extend completely across the gas passages, which, as shown, are relatively narrow. This influence is affected materially by the nature or structure of the material used, as evidenced by the fact that asbestos, which is a porous non-metallic silicious material, has a somewhat different action from that of crucible material, which, although somewhat porous, is in its nature different from that of asbestos. Some specific differences are also noticed between the behavior of this crucible material and ordinary clay pottery.

The converter may of course be operated at much lower temperatures, than above indicated, in which case it probably acts mainly as a vaporizer of the oil, instead of as a means for breaking down the complex hydrocarbon compounds and producing recombination of their constituents in the form of simpler hydrocarbon compounds. Nevertheless the converter operated at such low temperatures, delivers to the engine a vapor or gas distinctly different from that delivered by an ordinary carbureter; which gas or vapor from the converter when operated at low temperatures, though condensable entirely, or in the main, is a very excellent fuel for gas engines, and may be used therein with high fuel economy.

Both walls of the gas passages of the converter may be of material such as before referred to. This is illustrated in Fig. 3, showing a converter similar in construction to that shown in Fig. 1, except that in this case the intermediate cylinders 14 and 15 are omitted and the inner surfaces of cylinder 6 and cylinder 16 have linings 17 of crucible material or other material such as hereinbefore referred to. The gas passage provided in this construction of Fig. 3, is considerably shorter than that provided in Fig. 1, for equal dimensions, but since both sides of the gas passage are lined with porous material, a shorter passage is permissible for this reason: The construction shown in Fig. 3 has the further advantage that, the gas passage being more direct, the gas passes more freely through the converter and with less suction load on the engine.

The exhaust pipe of the engine may also be used as a means for heating the air supplied to the converter. This is illustrated in Fig. 6, in which 49 indicates the engine, 50 the exhaust pipe thereof, 51 a jacket surrounding the exhaust pipe, and 52 the converter. In the said jacket I have provided a spiral 53 to somewhat retard the passage of air through the jacket so as to prolong the period of its contact with the exhaust pipe.

In Fig. 4 a form of converter is illustrated which is similar to that shown in Fig. 3 except that the covering of the head of the cylinder 16, which covering, in this figure is designated by reference numeral 54, is conical, and is located somewhat lower with respect to the top of the converter, than is the covering 20 of Fig. 3, so providing a larger chamber in the upper portion of the converter for expansion of gases and vapors as they become heated in the upper portion of this converter. Also in Fig. 4 the linings 17 do not extend as far down as in Fig. 3, as it has been found that the converter is capable of very efficient action so long as sufficient surface area of contact materials (such for example as crucible material, earthenware, asbestos, etc.) are provided in the earlier portions of the apparatus. The converter shown in Fig. 4 further differs from that shown in Fig. 3 in that a distributing chamber 55 surrounds the air inlet ports 45 of the air chamber 5, so that air may be supplied to these ports and chamber 5 from some other suitable source, for example, a source of supply of heated air, such as the air heater 51 shown in Fig. 6 and hereafter referred to.

In Fig. 5 another form of converter is shown in which above the head of the inner cylinder 16, there are hollow conical contact bodies 56, 57 and 58, over which the entering jet of oil, or oil and air, will pass; these contact bodies being formed of contact material such as hereinbefore referred to (such for example as crucible material, earthenware, terra cotta, asbestos, etc.). Of these contact bodies 56, 57 and 58, 56 and 57 are shown as being hollow truncated cones open at the top and bottom, cone 57 being nested within cone 56, but with considerable space between the outer surface of cone 57 and the inner surface of cone 56. Cone 58 is shown closed at the top but open at the bottom. Cylinder 15 in this form of device has a truncated conical top portion 59, open at the top, and extending upward somewhat into the interior of cone 58. In the operation of this form of converter, the entering stream of oil or mixed oil and air, passes over the inner and outer surfaces of cones 56 and 57, and over the outer surface of cone 58 into the space between cylinders 6 and 14, and thence passes downward, through the ports 25, and up between cylinders 14 and 15, and thence downward through the space between cylinders 15 and 16, finally passing up through the interior of cylinder 16 and thence out through the gas discharge pipe 26.

In Fig. 7 I illustrate an alternative form of converter, adapted more especially for smaller sizes. In this figure 60 designates the main casing of the converter provided with an exhaust inlet, 61 designates a pot within casing 60 but spaced apart therefrom somewhat so as to provide a passage for the exhaust gases, 62 designates another pot, which, in the construction shown, may be formed of the crucible material previously described, and fits within pot 61; 63 designates another pot within pot 62 and of similar material, while 64 designates an intermediate partition or separator. 65 designates the gas discharge pipe and 66 a cover for the converter. 67 designates an air and oil admission pipe through which a mixture of air and oil, such as produced by the mixing valve 32 of Fig. 1, is admitted to the interior of the converter and caused to circulate through the zigzag passage to the gas discharge pipe 65. Within the casing of this converter a spiral rib 68 is provided which prolongs the path of the exhaust gases through the apparatus so that full heating effect therefrom is obtained. The main casing of the converter is surrounded by a jacket 69, the included space 70 forming an air heating chamber into which air may be introduced through a pipe 71 to be withdrawn, when heated, through pipe 72, and thereafter mixed with the gas produced by the apparatus.

In Fig. 8 I illustrate a similar alternative apparatus in which, instead of using pots of crucible material, earthenware, or the like, I use pots formed of metal covered over with asbestos or other suitable material 73 held in place by wire mesh material 74. In general, however, the use of asbestos is not preferred, except as it may be desired for temporary use, since, as above stated, it has been found that asbestos is apt to be covered in time with a deposit of graphitic carbon or the like.

Without limiting myself to any particular theory as to the operations which take place in the converter herein illustrated and described, I will state the following theory, based upon numerous observations as to temperature and other conditions in the converters, and upon numerous analyses of the gas: The oil, as it enters the converter, is probably in a state of fine physical subdivision and aerial suspension, i. e., it is in a form of a sort of mist. It will be noted that since the air in which this oil is so suspended, has been heated by passing through the air chamber 4 of the converter before it encounters the oil, this hot air necessarily raises the temperature of the oil, so making it quite fluid and so facilitating its subdivision into a mist consisting of extremely small drops in aerial suspension. Observations of the oil admission passage, made by removing the bonnet of the valve 32, while the converter is in operation, has made practically certain that the oil exists in this passage in the form of a mist. The mixture of oil and air, drawn into the converter through the port 31 by the suction of the engine, obviously causes the entering jet of mixed oil and air to impinge upon the heated covering 19 (Fig. 1) of the head of cylinder 14; such head being highly heated owing to the combustion within the converter and in particular to the high temperature existing in the space just below the head 18 of cylinder 14. This covering material 19, as well as the covering material 17 of the various cylinders, has two notable physical properties which may affect the character of the reactions taking place within the converter. These physical properties are, first, porosity and consequent ability to absorb oil by capillarity, and, second, a relatively low rate of heat conduction and transmission, as compared with iron and other metal walls heated to a similar temperature. Owing to the high temperature of coverings 19 and 17, their pores are presumably much more open than at ordinary atmospheric temperatures, and hence for this reason they are able to absorb more oil than they would be able to at ordinary atmospheric temperatures. On the other hand, owing to the high temperature of these porous substances, it is obvious that any oil absorbed in the pores of these substances will be volatilized or gasified immediately.

It is pointed out in my Patent No. 920,903 issued May 11, 1909, wherein oil is passed through the pores of a porous clayey septum from one side thereof to the other, that such porous materials have a very important influence on gasification of oil taking place within their pores. It is clear that oil penetrating the pores of the material 19, and thence escaping, owing to the high temperature of such material, will either be perfectly volatilized, or, and more probably, will be converted in large measure at least into a gas in which the hydrocarbon compounds are simpler than the complex hydrocarbon compounds forming the principal constituents of the entering oil. The relatively low rate of heat conductivity or transmission of the material 19, must it would seem have a further important influence on the changes taking place in the oil, particularly in those portions of the oil, if any, which do not penetrate the pores of the porous material but travel along or above the surface thereof. It is probable that the "cracking" of hydrocarbon oils when contacted with highly heated metal surfaces, is due in large measure at least to the resulting extremely rapid heating of the oil upon contact with such highly heated metal surfaces, owing to the high rate of heat transmission of which such metal surfaces are capable. But since the material 19 is incapable of transmitting heat rapidly, the effect of the passage of oil in fine drops or mist, over or just above the surface of that material, is probably to volatilize that oil more gradually than would be the case if such oil mist were passed over similarly heated metal surfaces, and that such gradual heating and volatilization obviates the cracking of the hydrocarbon compounds in such manner as to deposit tar or carbon, permitting and causing instead a different splitting up of the hydrocarbon compounds in such manner that the carbon is retained in combination.

It is well known that numerous chemical actions which are possible when dealing with masses of extreme minuteness, are not possible under conditions which are similar, except that the masses under treatment are greater. It seems probable that the reactions accompanying the splitting up of complex hydrocarbon compounds, such as present in oils, into simpler compounds, are of this nature; that when the oil is highly and suddenly heated in masses of even the size of small drops, it cracks with deposition of tar and carbon; but that when heated in the individually still more minute masses, such as those which can exist within the pores of the porous material, or when heated in the form of gaseous vapor produced by the volatilization of minute drops (such as the drops of the oil mist) the splitting up of the hydrocarbon molecules takes place differently and in such manner that no carbon or the like is thrown down. The air entering with the oil unquestionably exerts a marked influence upon the action which takes place, first, because, under the influence of the temperature obtaining in the converter, partial combustion is set up, and also probably, because if any carbon is thrown out as a result of changing composition of the hydrocarbon molecules, this carbon, being thrown out in a state of practically molecular subdivision, and in aerial suspension, probably combines immediately with the oxygen of the air present and in intimate mixture with the gas and vapor, producing either carbon monoxid or carbon dioxid. The hydrocarbon compounds present in the vapor or gas just above the porous material 19, obviously exist in a condition of almost molecular subdivision and in extremely thorough mixture with air, and the hydrocarbon compounds present in the pores of the material 19 and undergoing volatilization or gasification therein, must exist in an equal state of subdivision, or nearly so; consequently it is natural to expect that the changes in composition of these hydrocarbon compounds acted upon by the heat and air in individual quantities of extreme minuteness, will be of a different nature from that which occurs when oil in much larger masses contacts with metal surfaces highly heated.

The combustion occurring within the converter is incomplete and is in the nature of a partial and highly restricted oxidation, accompanied by the breaking down of the complex molecules of heavier hydrocarbons present in the oil, and the formation of new lighter hydrocarbon compounds. The hydrocarbon compounds present originally in the oil are understood to be in the main compounds of the paraffin or marsh gas series, in solution in one another. From the generally accepted theories of the combustion of such compounds, it is believed that this breaking down of the molecules of these compounds is accompanied by the combination of more or less of hydrogen of these compounds with the oxygen of the air, and, eventually with the combination of oxygen with part of the carbon. It is believed that the paraffin group molecules in changing composition, pass through a number of stages in which carbon and hydrogen are combined, with the hydrogen present in less proportion than in the paraffin group compounds. For example, upon opening the converter after it has remained idle for a time, an odor of ether has been noted, indicating the formation named within the converter of compounds of the ethylene group, which, during the period of rest of the converter, have been oxidized into ether and similar compounds.

The oil vapor or gas or mixture of both oil vapor and gas, in passing down through the space between cylinders 6 and 14 (Fig. 1) and over the porous material 17 in that space, is obviously given opportunity for very thorough contact with that porous contact material, so favoring considerable entry of oil vapor into the pores of the material 17, particularly in the upper portion of the space between cylinders 6 and 14, and the consequent giving out of gas from such material. Intimate contact of the gases and vapors passing downward through such space with the porous material, and penetration into the pores of such material by such gas or vapor, is probably aided through the fact that an engine drawing gas from the converter, necessarily draws the gas intermittently; and while a high speed four cylinder or six cylinder engine will of course draw the gas from the converter in very rapidly succeeding waves, nevertheless the pulsatory action is still present in the converter, the more so as the active expansion in the converter due to volatilization and gasification of the oil and due also to the increase in temperature, will cause a rapid building up of pressure in the converter during the brief intervals between strokes of the engine when no gas is being taken; the effect of oscillations in pressure being to drive the vapors and gases into the pores of the porous material and then to draw them out therefrom. The appearance of porous material in the converter, after long use, indicates that the action within the pores of that material is mainly in the upper portion of the material, in the space between cylinders 6 and 14. In fact, it is believed that in a sense, the initial portion of the converter serves mainly for volatilization of the oil and for initial gas formation, and that the later portions of the passage through which the gases and vapors travel, serve mainly as a fixing space.

The temperatures within the converter and at a point well beyond where the oil and air enter, have been found to approximate 1400° Fahrenheit; varying from 1300° Fahrenheit upward. Such temperatures have been indicated at about the head of the cylinder 15, by the fusion of Sagger cones of a melting temperature of about 1400° Fahrenheit, placed upon the head of that cylinder. The temperature of the porous head 19, of cylinder 14, near the outer edge of said cylinder, has been found, in a similar manner, to be about 1200° Fahrenheit. It is probable that the temperature in the space just above this head 19 and particularly near the inlet port 31, is somewhat less, owing to the great absorption of heat at this point as latent heat, and also to the fact that the temperature shown by Sagger cones resting upon the porous material 19, will naturally be higher than the temperature just above this material, since said material has a low rate of heat transmission and since it is heated in large measure by heat derived from the much hotter space beneath the head 18 and above the head of cylinder 15. The top of the converter, directly above the head of cylinder 14, shows no evidences of redness in actual operation, this also indicating that the temperature in the space just below the top of the converter is somewhat less than 1200° Fahrenheit. Combustion is probably initiated near the edge of the head of cylinder 14, at which point volatilization of the oil will have been substantially completed and much of the gas formation will presumably have occurred, the resulting vapors and gases being in a better condition for combustion than nearer the port 31, for these reasons, and also because they have been somewhat attenuated by expansion and have also been raised in temperature. The porous covering of the cylinder 14 probably exerts a material influence on the combustion occurring in the space between cylinders 14 and 6, favoring prolonged partial combustion through a space of considerable length, by what is termed "wall-action"; for similar action of refractory material forming the walls of the combustion spaces has been noted in furnace practice. The temperature of the gases issuing from the discharge pipe 28, as determined by an electrical pyrometer and also by Sagger cones, has been found to be materially less than the maximum temperature obtaining in the converter, the temperature of such issuing gases usually ranging from 1100° to 1300° Fahrenheit or thereabout; and these issuing gases have been found to have a materially higher temperature than the hot exhaust gases or the like circulating through the jacket 7; the temperature of the gas issuing from the converter being usually about 200° hotter than the gases in the jacket 7. It appears therefore that after the converter has been well heated by the gases passing through the jacket 7, and by initial combustion within the converter, the reactions occurring within the apparatus are self-sustaining and that the exhaust gases circulating through the jacket 7, act mainly to limit radiation of heat from the interior of the converter, by maintaining a relatively low heat head between the two sides of cylinder 6. It is not necessary to maintain circulation of heated gases through the jacket 7 continuously, but in the form of converter shown in Fig. 1 it is found that if the circulation of such gases through the jacket 7 be discontinued for any great length of time, the gasifying capacity of the converter will fall as it gradually cools. In the converter shown in Fig. 3, wherein the inner surface of the cylinder 6 is lined with material of low heat conductivity, it is probably possible to operate the converter for a long period of time, once it has been sufficiently heated, without the circulation of gases through the jacket 7.

It is found that the temperatures within the converter vary somewhat from time to time for various reasons, as for example, varying rates of supply of oil and air, both relative and absolute. It is probable, however, that the maximum temperature within the converter does not usually exceed 1600° Fahrenheit and that it is not desirable to exceed this temperature, since, while that temperature could be exceeded by supplying a greater proportion of air, the combustion would then be more complete and the resulting gas would be leaner and therefore less suitable for use in an engine. It has been found that the proportion of carbon dioxid in the gas varies somewhat with the relative amount of porous surface exposed; that in the converter shown in Fig. 1 for example, if the porous linings of cylinders 15 and 16 be removed, leaving exposed metal surfaces for contact with the gases, the converter still works without deposition of tar or carbon, and the engine operated from the converter works as efficiently and without smoke at the exhaust, and that the gas then issuing from the producer contains a somewhat smaller percentage of carbon dioxid than when the porous coverings of cylinders 15 and 16 are in use. It has been found for example, that, when the porous coverings of cylinders 15 and 16 are omitted, the proportion of the carbon dioxid in the gas falls to as low as one per cent. or less.

In some cases an additional air inlet 75 is provided in the gas supply pipe 28, close to the point at which the gas is to be used. In practice this pipe 75 is usually connected to the crank case of the engine, so that it draws off from the crank case the oil-charged air which, if allowed to escape from the various openings of the crank case, produces the oily odor commonly noted around gas engines.

In Fig. 1 the width of the passages between cylinders 6 and 14, 14 and 15, and 15 and 16, has been somewhat exaggerated for clearness of illustration. In one converter actually constructed, the height of cylinder 6 was about twenty six inches, and the width of the passage between the inner wall of cylinder 6 and the porous material covering cylinder 14 was about one quarter of an inch. Experience has shown that the passage can be somewhat wider than one quarter of an inch without detriment and with some advantages, and the corresponding passages of the converter shown in Figs. 3, 4 and 5 are for that reason shown somewhat wider in proportion.

In stating in this specification, that the converter operates without deposition of tar or carbon, I do not mean to exclude the formation of traces of such deposits when starting up, and, therefore, when conditions in the converter are not normal. Occasionally a slight deposit of carbon is noted on the head of cylinder 14, just beneath the port 31, the physical condition of this deposit indicating that it was formed when starting up and before conditions in the converter had become normal. This deposit, however, is never large enough to interfere with the operation of the converter, and does not increase with prolonged operation of the converter.

The converter in the various forms shown herein, is of course, suitable for use for supplying gas for purposes other than operating gas engines, and I have illustrated and described its use in connection with the gas engine, in this specification, merely because the gas engine is at once an important means for utilizing gas so produced, and an effective means for supplying hot gases for circulation through the jacket 7.

As above stated, when starting up the converter and engine, it may in general be started by gas stored within the converter from previous operations, and gas given off from the porous material as soon as the suction of the engine begins, the oil admitted to the converter when so first starting up, being probably converted, at first, to a vapor only. Combustion initiates within the converter automatically and very soon after the converter starts into operation, and then the temperature in the gas spaces of the converter probably rises very rapidly, although it is found that the temperature of the gas issuing from the converter rises somewhat slowly. This is an indication that the re-actions required to convert the oil into a vapor or gas suitable for use in the engine, take place in the main in the earlier portions of the converter, and that the actions which take place in the later portion of the converter during normal operation are in the nature of "fixing" reactions, due to the high temperature of such portions of the converter. The automatic initiation of combustion in the converter appears to be probably in the nature of a highly accelerated spontaneous combustion of the oil.

That in the converters illustrated and described herein, some action in the nature if a disintegration of the hydrocarbon compounds of the oil and gas takes place within the pores of the porous material, and well back from the contact surface of such material, is evidenced by the fact that the rings 17 covering the cylinder 14, if formed of fire clay or the like, show, if broken after long use, a trace of carbonaceous deposit within the pores of the material, but at a point well back from the surface. Such deposit is a mere trace, being only a slight blackening of the material, and is not sufficient to prevent the use of the material for extended periods without removal thereof. The fact that this blackening is found to exist in the pores of rings 17 located far below the top of cylinder 14, and at points where all of the liquid oil must have been converted into gas, indicates that even at these points the reduction of the hydrocarbon compounds to the final form contained in the issuing gas is incomplete; that is to say, that all the stages of transformation have not been passed through. In other words, the reduction of these hydrocarbon compounds is a somewhat slow process, requiring time for its completion. This blackening is also evidence that the gases themselves penetrate the pores of the porous material 17. As the form of the passages is such as to produce considerable swirling of the gases and vapors therein, and as the intermittent withdrawal of gas from the converter will also tend to produce swirling, it is probable that the contact of the porous material with the gases and vapors is very intimate; that practically all portions of the gas, at one time or another, are brought into thorough contact with the porous material. The reduced proportion of carbon dioxid in the gas from the converter of Fig. 1, when the porous coverings of cylinders 15 and 16 are omitted, shows that this porous material has some specific influence upon the combustion occurring in the combustion space—an influence in the nature of what is termed "wall action".

Obviously other liquid carbonaceous compounds besides the hydrocarbon oils may be gasified in this apparatus, for example, compounds in which carbon and hydrogen exist in combination with oxygen. The treatment of other liquid carbonaceous materials in this converter, for the formation of gas, I therefore regard as within my invention.

If for any reason it is preferred to have the apparatus herein described operate without the action within the pores of the porous material such as material 17 and 19, these bodies 17, 19, etc., may be provided with a surface glaze, in which case the action of these bodies on the fuel will be that of gradual heating due to the low heat conductivity of the material.

In certain of the following claims, I have applied to the several spaces which make up the return bend passage of the converter, that is to say, for example, the spaces between cylinders 6 and 14, cylinders 14 and 15 and cylinders 15 and 16, also cylinder 16 and discharge pipe 26, the term "runs", for lack of any other suitable term for such portions of the return bend passage.

In stating in certain of the following claims that the initial contact body (for example, the body 19, in Fig. 1) is located in advance of the combustion zone I mean that it is so located that the entering stream of material encounters such initial contact body before passing through the combustion zone.

What I claim is:—

1. The herein described method of making gas from hydrocarbon oils and other liquid carbonaceous materials, which comprises projecting against a heated body of porous material the liquid to be gasified, in a finely divided condition before said liquid has reached a high temperature, and passing the resulting product, mingled with air, to a region of high temperature, wherein partial combustion occurs, in the presence of porous material, and collecting and carrying off the resulting gas.

2. The herein described method of making gas from hydrocarbon oils and other liquid gas from hydrocarbon oils and other liquid carbonaceous materials, which comprises projecting against a heated body of porous material the liquid to be gasified, in a finely divided condition, before said liquid has reached a high temperature, and passing the resulting product, mingled with air, to a region of higher temperature, wherein partial combustion occurs, in the presence of porous material, and collecting and carrying off the resulting gas, the mixture being passed from the vicinity of its initial contact with such porous material, to the said higher temperature region, at such velocity that combustion initiates beyond the immediate vicinity of the point of admission.

3. The herein described method of making gas from hydrocarbon oils and other liquid carbonaceous materials, which consists in maintaining a high-temperature zone and projecting an intimate mixture of air and the liquid to be gasified into said zone and against an extended imperforate heated porous body within said zone and so causing the liquid to be absorbed in the pores of such body and then to be given up therefrom as a gas or vapor, and causing the resulting gases and vapors to pass through a further portion of said zone, and along the surface of porous material therein, and collecting and carrying away the resulting gas.

4. The herein described method of making gas from hydrocarbon oils and other liquid carbonaceous materials, which consists in maintaining incomplete combustion of the material to be gasified in a high-temperature zone in the presence of air insufficient in amount for complete combustion, supplying material for gas-formation to said zone by passing an intimate mixture of air and the liquid to be gasified, the latter in the form of minute separate drops, before said liquid has reached a high temperature, in heating proximity to an extended highly-heated surface of material having a low rate of heat transmission and causing the resulting product to pass into the region of combustion, at a rate such that combustion initiates beyond the immediate vicinity of the point of admission, and collecting and carrying off the resulting gas.

5. The herein described method of making gas from hydrocarbon oils and other liquid carbonaceous materials, which consists in maintaining incomplete combustion of the material to be gasified in a high temperature zone in the presence of air insufficient in amount for complete combustion, supplying material for gas formation to said zone by passing the liquid to be gasified in a heating proximity to an extended highly heated surface of a body of material having a low rate of heat transmission and causing the resulting product to pass into the region of combustion, and passing the heated gases of such zone of combustion into heating proximity to the said body and thereby maintaining the heat thereof.

6. The herein described method of making gas from hydrocarbon oils and other liquid carbonaceous materials, which consists in passing liquid to be gasified, mixed with air, against a hot surface of porous material and passing the resulting product through a high temperature region and therein maintaining incomplete combustion, and passing the heated gases of such combustion into heating proximity to an opposite surface of said porous material and thereby maintaining the heat thereof.

7. The herein described method of making gas from hydrocarbon oils, without material deposition of tar, carbon or the like, which consists in maintaining a hot zone having an initial low temperature portion, admitting oil to such low temperature portion and immediately bringing it into heating proximity to a heated body of porous material, and then passing the resulting product mingled with air, to the hotter portion of said hot zone.

8. The herein described method of making gas from hydrocarbon oils, without material deposition of tar, carbon or the like, which consists in maintaining a hot zone having an initial low-temperature portion, admitting oil to such low-temperature portion and immediately bringing it into heating proximity to a heated body of silicious material, and then passing the resulting product mingled with air, to the hotter portion of said hot zone.

9. The herein described method of making gas from hydrocarbon oils, without material deposition of tar, carbon or the like, which consists in maintaining a hot zone having an initial low-temperature portion, admitting oil to such low-temperature portion and immediately bringing it into heating proximity to a heated body of clayey material, and then passing the resulting product mingled with air, to the hotter portion of said hot zone.

10. The herein described method of making gas from hydrocarbon oils and other liquid carbonaceous materials, which consists in maintaining a high temperature zone having an initial low temperature portion and containing porous material, heating air and mingling such liquid carbonaceous material therewith and thereby forming a mixture consisting substantially entirely of air and carbonaceous material, and introducing such mixture into the low temperature portion of said high temperature zone and against porous material therein and producing incomplete combustion in said zone in the presence of porous material.

11. The herein described method of making gas from hydrocarbon oils and other liquid carbonaceous materials, without material deposition of tar, carbon or the like, which comprises passing the liquid to be gasified in a finely divided condition, and mingled with air insufficient to produce complete combustion, through a narrow channel having a heated wall of porous material, as a shallow stream passing over said wall, while maintaining said passage at a temperature sufficient to initiate and maintain combustion, by heat imparted from an external source, and thereby producing in said stream an incomplete combustion of such carbonaceous material.

12. The herein described process of making gas from hydrocarbon oils and other liquid carbonaceous materials, without material deposition of tar, carbon or the like, which comprises passing the liquid to be gasified, in a finely divided condition, and mixed with air insufficient in quantity for complete combustion, through a plurality of successive passages arranged in heating proximity to one another and separated from one another by heating material of low heat conductivity, while maintaining such passages at a temperature sufficient to initiate and maintain combustion, by heat imparted from an external source, and thereby effecting partial combustion of such carbonaceous material.

13. The process of manufacturing gas from hydrocarbon oils, which consists in passing a mixture of oil and air in the form of a vapor, into a moderately heated chamber and against and then over an extended surface of a heated body of porous material therein, and then passing the resulting product, at a rate such that combustion does not initiate in the immediate vicinity of the point of introduction into said chamber, into a lengthy passage lined on at least one side with porous material, and therein effecting partial combustion and by transference of heat from such combustion maintaining the temperature of the porous material with which the entering material initially contacts.

14. The herein described method of making gas from hydrocarbon oils and other liquid carbonaceous materials, which consists in passing finely divided oil against a surface of a porous body heated to above 800° Fahrenheit, and thereby causing the absorption of such oil into the pores of such porous material, and the generation of gas therein and escape of such gas from the same side of such porous material, at which the oil entered.

15. Gas producing apparatus comprising an inclosure having within it a combustion zone adapted to be maintained at a high temperature by partial combustion within it and provided with means for projecting into such zone air and combustible liquid to be gasified, and further provided in advance of such high temperature zone with a body of porous material having an extended surface across the path of the liquid entering said inclosure, means for producing in said zone initially a temperature sufficient to initiate combustion therein, and means for carrying away the gas produced.

16. Gas producing apparatus comprising an inclosure having within it a combustion zone adapted to be maintained at a high temperature by partial combustion within it and provided with means for mingling air and combustible liquid and for projecting the mixture into said zone, and further provided in advance of such high temperature zone, with a body of porous material having an extended surface across the path of the mixture so entering said inclosure, means for producing in said zone initially a temperature sufficient to initiate combustion therein, and means for carrying away the gas produced.

17. Gas producing apparatus comprising an inclosure having within it a combustion zone adapted to be maintained at a high temperature by partial combustion within it and provided with means for projecting into such zone combustible liquid to be gasified, and further provided in advance of such high temperature zone, with a body of material of low heat conductivity having an extended surface across the path of the mixture so entering said inclosure and arranged to be heated by combustion within the inclosure, and means for producing in said zone initially a temperature sufficient to initiate combustion therein.

18. Gas producing apparatus comprising an inclosure having within it a combustion zone adapted to be maintained at a high temperature by partial combustion within it and provided with means for mingling air and combustible liquid and for projecting the mixture into said zone, and further provided in advance of such high temperature zone, with a body of material of low heat conductivity having an extended surface across the path of the mixture so entering said inclosure and arranged to be heated by combustion within the inclosure, and means for producing in said zone initially a temperature sufficient to initiate combustion therein.

19. Gas producing apparatus comprising an inclosure having within it a combustion zone adapted to be maintained at a high temperature by partial combustion within it, and having in it an extensive surface of porous material, and provided with means for projecting into such zone combustible liquid to be gasified, and further provided in said inclosure and in advance of such high temperature zone with a body of porous material having an extended surface across the path of the liquid so entering said inclosure, means for producing in said zone initially a temperature sufficient to initiate combustion therein, and means for carrying away the gas produced.

20. Gas producing apparatus comprising an inclosure having within it a combustion zone containing porous material and adapted to be maintained at a high temperature by partial combustion within it and provided with means for mingling air and combustible liquid and for projecting the mixture into said zone, and further provided in advance of such high temperature zone, with a body of porous material having an extended surface across the path of the mixture so entering said inclosure, means for producing at initial points in said zone a temperature sufficient to initiate combustion therein, and means for heating the air to be mixed with said liquid, prior to contact therewith.

21. Gas producing apparatus comprising an inclosure having within it a combustion zone adapted to be maintained at a high temperature by partial combustion within it and adapted for gas-formation and provided with means for supplying liquid to be gasified and air to said zone and with a body of porous material within said inclosure and in advance of such high temperature zone, adapted to be heated and having an extended surface adapted to contact with the material to be gasified upon introduction, said apparatus further comprising a passage in heating relation to said inclosure and adapted for the circulation through it of heating medium.

22. Gas producing apparatus comprising an inclosure adapted for combustion within it and provided with means for supplying combustible liquid and air, and a body of porous material within said inclosure having an extended surface adapted for contact with the liquid and gases passing therethrough, a portion of said porous material being across the path of the entering liquid, said body substantially separating a zone of high temperature within said inclosure from that portion into which the combustible first enters, said apparatus further comprising a passage in heating relation to said inclosure and adapted for circulation through it of heating medium.

23. Gas producing apparatus comprising an inclosure adapted for combustion within it and provided with means for supplying combustible liquid and air, and a body of material of low heat conductivity within said inclosure having an extended surface adapted for contact with the liquid and gases passing therethrough, a portion of said material within said inclosure being across the path of the entering liquid, said body substantially separating a zone of high temperature within said inclosure from that portion into which the combustible first enters, said apparatus further comprising a passage in heating relation to said inclosure and adapted for circulation through it of heating medium.

24. Gas producing apparatus comprising an inclosure having within it a gas-forming passage containing porous material, means for supplying to said passage a gas forming mixture consisting of a mixture of combustible liquid and air, a body of porous material located across the path of the combustible mixture so supplied and adapted for contact therewith directly after entrance thereof to said passage, and means deriving heat from an external source for heating said inclosure initially to a temperature such that combustion occurs therein.

25. Gas producing apparatus comprising an inclosure having within it a gas-forming passage comprising two portions arranged for successive flow of gas through them and in heat-transmitting proximity to one another but separated by material of low heat conductivity, and means for supplying liquid combustible and air to said inclosure and for projecting the entering mixture against a portion of said material, and means for initiating incomplete combustion of the mixture in an initial portion of said passage and continuing combustion through a considerable portion of said passage.

26. Gas producing apparatus comprising an inclosure having within it a gas-forming passage comprising two portions arranged for successive flow of gas through them and in heat-transmitting proximity to one another but separated by porous material adapted to contact with the combustible passing through the first portion of said passage and to impart to such combustible heat received from the second portion of said passage, and means for supplying liquid combustible and air to said inclosure and for projecting the entering liquid against a portion of said material, and means for initiating incomplete combustion of the combustible in an initial portion of said passage and continuing combustion through a considerable portion of said passage.

27. Gas producing apparatus comprising an inclosure having within it a return-bend gas passage, the several runs of which are arranged one within another and in heat transferring relation to one another, a body of porous material within the first of said runs, and means for supplying air to said passage and for directing combustible liquid against said porous material, and means for initiating and maintaining incomplete combustion thereof along said passage.

28. Gas producing apparatus comprising an inclosure having within it a return-bend gas passage, the several runs of which are arranged one within another and in heat transferring relation to one another, a body of material of low heat conducting capacity within the first of said runs, and arranged to be heated by gas in another run, means for supplying air to said passage and for directing combustible liquid against an extended surface of said body, and means for initiating and maintaining incomplete combustion of the combustible along said passage.

29. Gas producing apparatus comprising an inclosure having within it a return-bend gas passage, the several runs of which are arranged one within another and in heat transferring relation to one another, a body of material of low heat conducting capacity within the first of said runs, and arranged to be heated by gas in another run, means for introducing a limited amount of air and for directing combustible liquid in heating proximity against an extended surface of said body, means for initiating and maintaining incomplete combustion of the combustible along said passage, and a body of porous material within the combustion zone of said passage.

30. Gas producing apparatus comprising an inclosure having within it a return bend passage, a body of porous material in the initial portion of said passage, means for directing combustible liquid thereagainst and for supplying air to said passage, and a heating passage in heating relation to said return bend passage and adapted for the circulation through it of a heating medium.

31. Gas producing apparatus comprising an inclosure having within it a return bend passage, a body of porous material in the initial portion of said passage, means for directing combustible liquid thereagainst, and a heating passage in heating relation to said return bend passage and adapted for the circulation through it of a heating medium, and an air heating chamber in heating relation to said heating passage, and means for mingling air heated in such chamber with the liquid combustible.

32. Gas producing apparatus comprising a plurality of cylinders one within another forming a return bend gas passage, one of said cylinders, forming a wall of the initial portion of said passage, having a surface of porous material, means for passing air and liquid to be gasified against and over said porous material, and means for heating said cylinders.

33. Gas producing apparatus comprising a plurality of cylinders one within another forming a return bend gas passage, one of said cylinders, forming a wall of the initial portion of said passage, having a head surface of porous material, and means for passing liquid to be gasified into contact with and over said porous head surface and for maintaining incomplete combustion of such liquid in said passage, the combustion zone of said passage beyond said head surface comprising other porous material.

34. Apparatus for making gas from hydrocarbon oils which comprises a return bend passage, one run of which is located within another run thereof, said passage containing porous material, means for producing a mixture consisting substantially entirely of air and oil and for admitting such mixture to said passage, and means for supplying sufficient heat from an external source to initiate and maintain partial combustion in the presence of such porous material.

35. Apparatus for making gas from hydrocarbon oils which comprises a return bend passage, one run of which is within another run thereof, said passage containing porous silicious material, means for producing a mixture consisting substantially entirely of air and oil and for admitting such mixture to said passage, and means for supplying sufficient heat from an external source to initiate and maintain partial combustion in the presence of such porous material.

36. Apparatus for making gas from hydrocarbon oils which comprises a narrow passage containing porous earthenware, such passage being of relatively great length as compared with its width, means for heating said passage initially, and means for mingling air and oil and for admitting such mixture to said passage, and thereby producing restricted combination of oxygen of the air with constituents of the oil and so maintaining an effective gasifying temperature in the passage.

37. Gas producing apparatus comprising an inclosure adapted for combustion within it and provided with means for supplying combustible liquid and air, and a body of porous material within said inclosure having an extended surface adapted for contact with the liquid and gases passing therethrough, a portion of said porous material being across the path of the entering air and liquid, and means for initiating and maintaining combustion within said inclosure.

38. In the manufacture of gas, the process which comprises passing a mixture of finely divided oil with insufficient air for complete combustion through an outer passage while at a temperature sufficient to produce partial combustion, said outer passage containing material adapted to facilitate combustive reaction, then through an inner passage surrounded by the said outer passage and having a wall in common therewith, and taking away combustible gas to a point of consumption from the inner passage.

39. In the manufacture of gas, the process which comprises passing a mixture of finely divided oil with insufficient air for complete combustion through a relatively narrow inner passage entirely surrounded by the said outer passage and having a wall in common therewith, and taking away combustible gas to a point of consumption from the inner passage.

40. A gas-making apparatus provided with an outer chamber containing reaction-facilitating material, an inner chamber in communication with the outer chamber at one end and surrounded by said outer chamber and having a wall in common therewith, means for introducing oil and an insufficient amount of air for complete combustion into the other end of the outer chamber and means for removing combustible gas from the inner chamber.

41. A gas-making apparatus provided with an outer chamber provided with porous reaction-facilitating material, an inner chamber in communication with the outer chamber at one end and surrounded by said outer chamber and having a wall in common therewith, means for introducing oil and an insufficient amount of air for complete combustion into the other end of the outer chamber and means for removing combustible gas from the inner chamber.

In testimony whereof I have signed this specification in the presence of two subscribing witnesses.

ELIJAH B. BENHAM.

Witnesses:
E. F. ELDREDGE,
LOUIS C. KENYON.